United States Patent [19]
Hazen

[11] 3,881,506
[45] May 6, 1975

[54] DOSING SYPHON

[75] Inventor: Thamon E. Hazen, Ames, Iowa

[73] Assignee: Iowa State University Research Foundation, Inc., Ames, Iowa

[22] Filed: July 26, 1973

[21] Appl. No.: 382,652

[52] U.S. Cl. ............ 137/137; 210/DIG. 21; 61/18; 119/77; 137/592
[51] Int. Cl. ............................................ F07f 10/02
[58] Field of Search ........... 137/137, 138, 139, 136, 137/132, 590, 591, 592; 4/42, 43, 47, 48, 101, 206; 210/163, 164, 165, DIG. 21; 61/18; 119/77

[56] References Cited
UNITED STATES PATENTS

| 440,197 | 11/1890 | Putnam | 4/43 X |
| 485,759 | 11/1892 | Field | 137/138 |
| 848,365 | 3/1907 | Harrigan | 137/138 |
| 3,486,523 | 12/1969 | Mullings | 137/590 X |
| 3,589,395 | 6/1971 | Bottum | 137/592 |

FOREIGN PATENTS OR APPLICATIONS

| 1,435 | 1/1891 | United Kingdom | 137/137 |
| 183,441 | 1887 | France | 137/137 |
| 620 | 1/1896 | United Kingdom | 137/138 |

Primary Examiner—Henry T. Klinksiek
Attorney, Agent, or Firm—Zarley, McKee, Thomte & Voorhees

[57] ABSTRACT

A dosing syphon for hydraulic transport of livestock and poultry wastes is disclosed. The dosing syphon comprises a water reservoir having a bell compartment means therein which is spaced from the bottom portion of the water reservoir. The bell compartment has a closed upper portion and a lower portion in communication with the interior of the housing for receiving water from the interior thereof. A substantially vertical conduit having an open upper end is positioned within the bell compartment and extends downwardly and outwardly through the housing. The vertical conduit includes a trap element for capturing a quantity of water therein. The vertical conduit has a water charging opening formed therein at the upper end thereof above the bottom portion of the bell compartment but below the open upper end of said vertical conduit so that a supply of water will be available to the trap while the water level rises within the bell compartment but before the water flows into the upper end of the compartment so that a constant supply of water will be available in the trap element. In another embodiment the bell compartment has a bell compartment air inlet. In still another embodiment the upper end of the vertical conduit positioned in the bell compartment is beveled to increase the water discharge rate.

3 Claims, 4 Drawing Figures

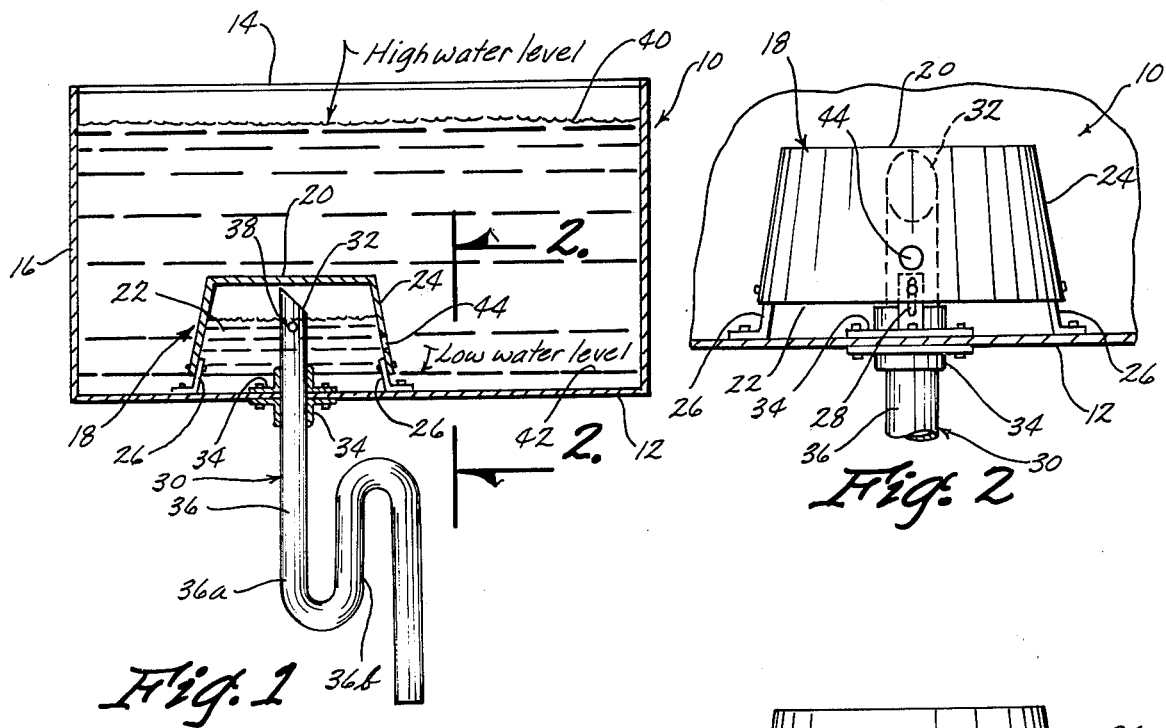
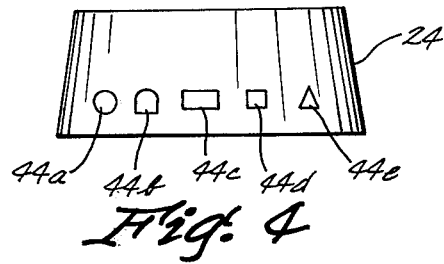
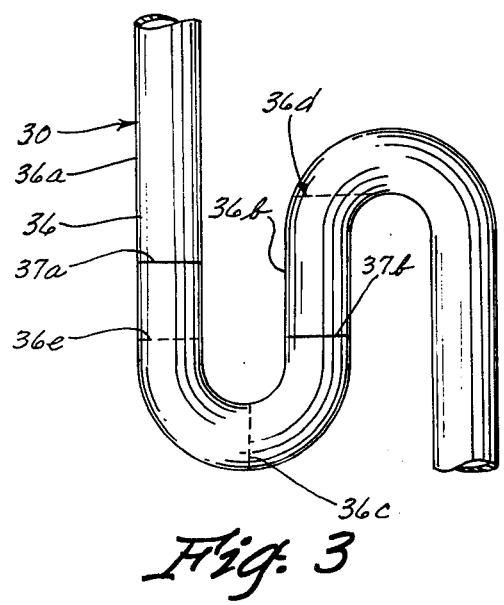

DOSING SYPHON

The problem of removing manure from swine and poultry buildings is a troublesome one. One method for removing manure from swine buildings is the open flushing gutter that runs through the pen area. Hogs learn to defecate and urinate in the gutter. Cleaning water is rapidly discharged down the gutter at one hundred gallons per minute or greater which carries the manure from the building to a storage pit or waste treatment device. One of the problems associated with the flushing gutter system has been to devise equipment that will dependably discharge cleaning water into the gutter.

Therefore, it is a principal object of this invention to provide an improved dosing syphon.

A further object of this invention is to provide an improved dosing syphon for discharging cleaning water into flushing gutters.

A still further object of this invention is to provide a dosing syphon for hydraulic transport of livestock and poultry wastes.

A further object of this invention is to provide a dosing syphon having means thereon to insure that the trap associated therewith will be properly charged.

A further object of this invention is to provide a dosing syphon which automatically supplies water to a flushing gutter system.

A further object of this invention is to provide a dosing syphon having the ability to rapidly discharge water into a flushing gutter system.

A further object of this invention is to provide an improved dosing syphon which is economical of manufacture and durable in use.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings, in which:

FIG. 1 is a partial sectional view of the dosing syphon; and

FIG. 2 is a sectional view as seen along lines 2—2 of FIG. 1.

FIG. 3 is an enlarged view of the water trap of the dosing syphon showing varying water positions therein.

FIG. 4 is a view of the bell compartment showing varying geometric shapes for a bell charge opening.

In FIG. 1, the numeral 10 generally refers to a water reservoir having a bottom 12, top 14 and a side wall portion 16. Water reservoir 10 is in communication with a water pump adapted to pump water thereinto at a predetermined rate.

The numeral 18 refers to an inverted bell compartment having a closed upper portion 20 and an open lower portion 22 which is in communication with the interior of the water reservoir or housing 10. As seen in FIGS. 1 and 2, the lower portion of the bell compartment is spaced above the bottom 12 of the reservoir 10. For purposes of description, bell compartment 18 will be described as having a skirt portion 14. The bell compartment 18 is secured to the bottom 12 by means of a plurality of spaced apart brackets 26. As seen in FIG. 2, the brackets 26 are provided with an elongated slot 28 therein which permits the bell compartment 18 to be selectively vertically adjusted with respect to the bottom 12.

The numeral 30 refers to a substantially vertical conduit having an open upper end 32 positioned within the bell compartment 18 and extending downwardly therefrom through the bottom 12 of the water reservoir 10. Suitable seal means 34 is provided around the conduit 30 and the bottom 12 as seen in FIG. 1. The numeral 36 refers to a trap portion formed in the conduit 30 to capture a quantity of water therein so that the water within the reservoir 10 will not discharge through the conduit until a sufficient water level has been reached which is sufficient to overcome the head within the trap 36.

Conduit 30 has a water charging opening 38 formed therein at the upper end thereof which is positioned above the bottom portion of the bell compartment 18 but below the open upper end of conduit 30 so that a supply of water will be available to the trap 36 while the water level rises within the compartment 18. Conduit 30 is in communication with the flushing gutter system of the system.

An embodiment of my invention relating to use of the water charging opening 38 is disclosed and claimed in pending application Ser. No. 287,672 filed Sept. 11, 1972, now U.S. Pat. 3,797,513. I have now discovered that while a dosing syphon as described therein functions adequately, that when the open upper end 32 of conduit 30 is a straight or approximately level cut, vortexing of the water will occur causing a reduced water throughput and corresponding decreased efficiency of the syphon. The phenomenon which occurs is much like the natural vortexing, or swirling action of water as it drains from a sink. This rotational movement of the water can prevent full capacity throughput in vertical conduit 30. However, it has now been discovered that the natural rotational movement of the water as it enters the upper end 32 of conduit 30 can be substantially eliminated if the upper end 32 of conduit 30 is a beveled cut as shown at 32 rather than a horizontal cut. The bevel cut can vary from 30° downward from the horizontal to about 60° downward from the horizontal but is preferably at 45°. Surprisingly, such a beveled cut upper end 32 will provide up to a 50% increase in the throughput efficiency of the dosing syphon.

For purposes of description, the numeral 40 refers to the high water level within the reservoir 10 while the numeral 42 will be used to identify the low water level within the reservoir 10.

Assuming that the dosing symphon has just functioned, the cycle of operation will be described with the lower water level being approximately at 42. The water pump is actuated so as to supply water to the reservoir 10 to fill the same. As the reservoir 10 is filled, the water in the compartment 18 rises at approximately the same rate as the water outside the bell compartment 18. As the water level rises inside the compartment 18, air is trapped between the water inside of the bell compartment 18 and the upper end 20 thereof. The trapped air in the bell compartment prevents the water level inside the bell compartment 18 from rising as much as the level outside the bell compartment 18. As the reservoir 10 fills, a difference in water level inside and outside the bell compartment 18 develops. This difference in water level or head compresses the air inside the bell compartment 18. The compressed air within the bell compartment 18 prevents the water from flowing downwardly through the open upper end of the conduit 30 until such time as the water within the reservoir 10 reaches the high water level 40. At the high water level 40, the head within the reservoir 10 is sufficient to overcome the head developed by the water in the trap thus forcing water out of the trap, and air out of bell compartment 18, so that the water within reservoir 10 are then discharged downwardly through the open upper end of the conduit 30. The water discharges from the reservoir 10 until the water reaches the approximate low level 42. The rapid rate of discharge from the reservoir 10 causes a flushing action in the flushing gutters of the system so as to hydraulically transport the animal waste from the gutters.

The dosing syphon will not function if water is not present in the trap portion 36 during the filling operation of the water reservoir 10. The rapid discharge of water from the reservoir 10 tends to pull or suck the water from the trap and the reservoir 10 will not properly fill during the next cycle since the water will simply run downwardly through the conduit 30. The charging opening 38 insures that the trap portion 36 will be properly charged so that the dosing syphon will properly function. As the water rises under the bell compartment during the filling operation of the reservoir 10, the water passes through the charging or aspiration opening 38 to charge the trap portion 36 of water. A small amount of water will trickle from the trap portion 36 into the flushing gutters but the amount does not constitute a wastage of water due to the size of the charging opening 38. Thus, the charging opening 38 insures that the trap portion 36 will be properly charged with water to prevent water in the reservoir 10 from discharging therefrom until the high water level 40 is reached.

Some constructional considerations are also worthy of note. The position of the bottom of the bell compartment 18 determines the lowest level of the water at the end of the discharge cycle. Preferably, the position of the bottom of the bell compartment 18 should be as close as the bottom of the reservoir 10 as possible without restricting flow into the bell compartment. There is a minimum distance above the discharge end of the conduit 30 and the water level in the reservoir 10 with sufficient head is available to insure that the full pipe flow is developed. Although such is difficult to calculate exactly, a rule of thumb is to make the distance approximately five times as great as the diameter of the conduit 30. The required volume of the bell compartment 18 is related to the volume of the inlet portion of the conduit 30 and the trap portion 36. In general, it is recommended that the volume of the bell compartment 18 be approximately five or more times the volume of the inlet pipe portion and the trap portion. The position of the upper end of the conduit 30 with respect to the bell compartment 18 is also quite important. Insufficient intrusion of the conduit 30 into the compartment will result in premature discharge and lack of full syphoning. Inadequate clearance between the top of the conduit 30 and the top portion 20 of the bell compartment 18 will restrict flow into the conduit 30 thereby reducing the rate of discharge.

An additional improvement over the dosing syphon of my previous application relates to the utilization of a bell compartment air charge hole or opening 44 positioned just above the low water level 42 in the cylindrical side wall of bell 18. In the absence of such a bell charge air opening 44 the following may occur. The water present under the bell 18 after the syphoning cycle is slightly above the low water level 42. The trap 36 will contain water in both sides of the trap 36a, and 36b at equilibrium shown by water level lines 37a and 37b. As the tank or reservoir 10 is filled and the water level rises toward the high water level 40 the water level in the bell compartment 18 will also rise with the pressure under the bell changing from negative to positive. However, the bell compartment 18 will not completely fill because air trapped therein will be compressed and assert a counter force. As the water level in reservoir 10 continues to rise the vacuum will be relieved on the air trapped in bell compartment 18 because of the water head between the level in the tank 10 and the level in the bell compartment 18. As the air trapped in bell compartment 18 rises there will be a shift in the water level in trap 36, short of, or in other words, rearward of the position shown in FIG. 3 by dotted lines 36c and 36d.

In this position trapped air cannot escape from trap 36 by bubbling through the water. When the water level in bell compartment 18 rises just to the level of the open upper end 32 of conduit 30, water will trickle into conduit 30 filling the trap to positions 36e and 36d of FIG. 3. Additionally, water will trickle from the position of 36d down through the conduit forwardly of level 36d at the same rate. As a result it is possible to reach an equilibrium condition between the water level in tank 10, bell compartment 18, the air trapped in bell compartment 18, the water defined at 36e and 36d, and the air trapped in trap 36 wherein the result will be a continuous water trickle into conduit 30 and out of conduit 30. Thus the syphon will not function properly to provide an adequate water flow for flushing.

However, it has now been discovered that an air charge hole approximately located in the skirt portion 24 of the bell 18, will substantially prevent the equilibrium condition previously described as adverse to proper syphoning. The bell compartment air charge hole 44 of bell 18 should be located above the low water level 42 in order to destroy the adverse equilibrium condition previously described. The precise position, shape and size of bell compartment air charge hole 44 can be varied and should be varied depending upon the size of tank or reservoir 10, the two terms being utilized interchangeably herein, the size of bell compartment 18, the low water level 42 and the size of conduit 30 and the like. However, the single critical factor is that bell compartment air charge hole 44 must be above the low water level 42.

As seen in FIG. 4, the bell compartment air charge opening 44 can be circular as shown at 44a; it can be inverted U shape, 44b; it can be a rectangular shape, 44c, it can be square shaped 44d; it can be the shape of an inverted V, 44e and the like.

When bell compartment 18 has a bell compartment air charge hole 44 the syphon will not reach the adverse equilibrium condition previously described. After completion of the syphoning cycle with the water level in bell compartment 18 at the low water level 42 and the water level in trap 36 at 37a and 37b, when more water is added to reservoir 10 to increase the water level toward the high water level 40, the following will occur. Since after completion of syphoning there is a negative pressure within the air space of bell compartment 18 and trap 36, air will rush through bell compartment air charge hole 44 to equalize this pressure differential.

As the water rises in bell compartment 18 because of more water addition to reservoir 10, the increased pressure will force the water level from the position shown at 37a and 37b forwardly toward that shown at 36c and 36d. In this instance however because of the increased pressure caused by the air entering ball compartment 18 through bell compartment air charge hole 44, the pressure is sufficiently great to move the water column into the position defined by dotted lines 36c and 36d. As a result, air can escape past 36d through conduit 30. When this happens, the pressure under the bell is quickly lowered, the bell 18 floods completely and syphoning is initiated. Thus the syphon will truly function in proper syphonic fashion without the syphon disruption caused by the previously described adverse equilibrium. Thus an improved dosing syphon is attained.

The improvements over my original dosing syphon described and claimed in the previously referred to application, i.e., the beveled cut at the upper end of conduit 30, and the bell compartment air charge hole 44 can be used alone or in combination with each other and in combination with the dosing syphon of my application Ser. No. 287,672, filed Sept. 11, 1972.

What is claimed is:

1. In a dosing syphon, comprising, a water reservoir comprised of a housing having bottom and top portion, a bell compartment means in said housing and spaced from said bottom portion, said bell compartment means having a closed upper portion and a lower portion in communication with the interior of said housisng for receiving water from the interior of said housing, a substantially vertical conduit extending from an upper open end within said bell compartment means downwardly and outwardly through said housing, a trap element in said conduit to capture a quantity of water therein at times, a water charging opening in communication with the interior of said conduit adjacent said opening in the upper portion of said conduit below the upper end thereof and above the bottom portion of said bell compartment means so that a supply of water will be available to said trap element while the water level rises within said bell compartment means but before water flows into the upper end of said compartment, wherein a constant supply of water will be available in said trap element, said vertical conduit having a beveled open upper end whereby the natural rotational movement of water as it enters said conduit is substantially eliminated, said open upper end being continuously sloped.

2. The dosing syphon of claim 1 wherein the bevel is downward from horizontal angle of from about 30° to about 60°.

3. The dosing syphon of claim 2 wherein the angle is 45°.

* * * * *